(12) United States Patent
Mairs et al.

(10) Patent No.: US 8,611,522 B2
(45) Date of Patent: Dec. 17, 2013

(54) TELEPHONE CALL PROCESSING METHOD AND APPARATUS

(75) Inventors: Chris Mairs, Middlesex (GB); Paul Brittain, Middlesex (GB); Martin Taylor, Middlesex (GB)

(73) Assignee: Metaswitch Networks Ltd, Enfield (GB)

(*) Notice: Subject to any disclaimer, the term of this patent is extended or adjusted under 35 U.S.C. 154(b) by 1291 days.

(21) Appl. No.: 12/041,542

(22) Filed: Mar. 3, 2008

(65) Prior Publication Data

US 2008/0240400 A1  Oct. 2, 2008

Related U.S. Application Data

(63) Continuation of application No. PCT/EP2006/065985, filed on Sep. 4, 2006.

(30) Foreign Application Priority Data

Sep. 2, 2005  (GB) .................................. 0517944.5

(51) Int. Cl.
*H04M 7/00* (2006.01)
*H04L 12/66* (2006.01)

(52) U.S. Cl.
USPC ...................................... 379/221.02; 370/352

(58) Field of Classification Search
USPC ...................... 379/221.02; 370/354, 356, 352
See application file for complete search history.

(56) References Cited

U.S. PATENT DOCUMENTS 5,452,353 A * 9/1995 Menezes ................... 379/355.08
5,475,743 A * 12/1995 Nixon et al. ............. 379/355.07
6,229,883 B1 * 5/2001 Kakizaki et al. ......... 379/142.04
7,369,545 B1 * 5/2008 West et al. .................... 370/354
7,406,330 B2 * 7/2008 McConnell et al. ........ 455/554.1
7,512,116 B2 * 3/2009 Ohura ........................... 370/352

(Continued)

FOREIGN PATENT DOCUMENTS

| CA | 2414909 A1 | 6/2003 |
|---|---|---|
| JP | 2005086786 A | 3/2005 |
| WO | 0046973 A2 | 8/2000 |
| WO | 02075572 A1 | 9/2002 |

OTHER PUBLICATIONS

NeuStar; "ENUM: Driving Convergence in the Internet Age"; May 25, 2004; http://www.enum.org.

(Continued)

*Primary Examiner* — William Deane, Jr.
(74) *Attorney, Agent, or Firm* — Baker & Hostetler LLP

(57) ABSTRACT

A method and apparatus for processing telephone calls in a packet-based telephony service is disclosed. A store of telephone party identifiers is maintained for multi-service users having access to the packet-based telephony service and an alternate telephony service. Incoming signaling information for telephone calls in the packet-based telephony service is monitored and outgoing signaling information may be altered with reference to the store. An alteration may involve replacing telephony party identification data associated with one telephony service for telephony party identification data associated with another telephony service. The invention allows a multi-service user to be consistently identified by other telephony users by a single telephony party identifier instead of one telephony party identifier for each service they subscribe to. Further, a multi-service user can be identified at the call destination by a single telephony party identifier, irrespective of which telephony service is used to make the call.

16 Claims, 3 Drawing Sheets

(56) References Cited

U.S. PATENT DOCUMENTS

| | | | |
|---|---|---|---|
| 7,675,900 B1* | 3/2010 | Parham et al. | 370/352 |
| 7,742,768 B2* | 6/2010 | Liu et al. | 455/445 |
| 2002/0165969 A1* | 11/2002 | Gallant | 709/227 |
| 2003/0091028 A1 | 5/2003 | Chang et al. | |
| 2004/0192292 A1 | 9/2004 | Chang et al. | |
| 2005/0008008 A1* | 1/2005 | Ohura | 370/352 |
| 2005/0157702 A1* | 7/2005 | Motohashi | 370/352 |
| 2005/0190721 A1 | 9/2005 | Pershan | |
| 2005/0190750 A1* | 9/2005 | Kafka et al. | 370/352 |
| 2006/0007915 A1* | 1/2006 | Frame | 370/352 |
| 2006/0087968 A1* | 4/2006 | Bowen et al. | 370/229 |
| 2006/0211453 A1* | 9/2006 | Schick | 455/564 |
| 2006/0262913 A1* | 11/2006 | Cook et al. | 379/88.19 |
| 2007/0036140 A1* | 2/2007 | Nejah | 370/352 |
| 2007/0036337 A1* | 2/2007 | Lu | 379/399.01 |
| 2007/0064594 A1* | 3/2007 | Norton | 370/218 |
| 2007/0087730 A1* | 4/2007 | Diroo et al. | 455/413 |
| 2007/0127679 A1* | 6/2007 | Matsuhashi et al. | 379/218.01 |
| 2007/0253406 A1* | 11/2007 | Menasco et al. | 370/352 |
| 2007/0282911 A1* | 12/2007 | Bantukul et al. | 707/104.1 |
| 2013/0039362 A1* | 2/2013 | Emmanuel | 370/352 |

OTHER PUBLICATIONS

Faltstrom Cisco Systems Inc.; "RFC 2916 E.164 number and DNS"; IETF Standard, Sep. 2000.

* cited by examiner

TELEPHONE CALL PROCESSING METHOD AND APPARATUS

CROSS-REFERENCE TO RELATED APPLICATIONS

This application is a continuation, under 35 U.S.C. §120, of International Patent Application No. PCT/EP2006/065985, filed Sep. 4, 2006 under the Patent Cooperation Treaty (PCT), which was published by the International Bureau in English on Mar. 8, 2007, with International Publication Number WO 2007/026029 A2, which designates the United States and claims the benefit of GB Application No. 0517944.5, filed Sep. 2, 2005. All above-referenced prior applications are incorporated by reference herein in their entirety and are hereby made a portion of this specification.

BACKGROUND OF THE INVENTION

1. Field of the Invention

This invention relates to a method and apparatus for processing telephone calls in a packet-based telephony service. In particular, but not exclusively, the invention relates to the processing of such calls in a multi-carrier telecommunications network which includes a plurality of independent network operators each providing telephony services to subscribers via their carrier networks.

2. Description of the Related Technology

Conventional multi-carrier telecommunication networks typically have an Incumbent Local Exchange Carrier (ILEC) which owns most of the local telephone infrastructure and other local carriers, known as Competitive Local Exchange Carriers (CLECs) which compete with the ILEC. A CLEC provides its services by subcontracting network facilities from the ILEC and provides alternative services to subscribers.

The CLEC may provide a packet-based service over a connection such as a digital subscriber line (DSL) connection. A DSL connection is suitable for transmitting analogue voice calls and packet-based data simultaneously down the same telephone line. Voice calls can also be sent as packet-based data using the Internet Protocol (IP), and such calls are known as Voice over Internet Protocol (VoIP) calls.

The International Telecommunications Union standards for telecommunications (ITU-T) body specifies the Signaling System #7 (SS7) protocol for digital exchanges with integrated services. The SS7 protocol provides international data network and signaling protocols that control calls passing through a PSTN. SS7 employs out-of band signaling to transmit messages between switches and other network entities via circuit-switched connections such as redundant data links. SS7 includes a sub-protocol known as the Integrated Services Digital Network User Part (ISUP).

The ISUP protocol is a functional part of SS7 which defines the procedures used for transfer of call setup and teardown signaling information between signaling points over a PSTN. ISUP is used for both ISDN and non-ISDN calls. Different variants of ISUP exist, for example the European Telecom Standardization Institute (ETSI) ISUP variant is used in Europe.

Each ISUP variant specifies a mandatory part for fixed-length mandatory parameters and an optional part for variable length optional parameters. An ISUP Initial address Message (IAM) is sent in the forward direction by each switch in the path from calling party to called party. An IAM contains the called party number in the mandatory variable part and may contain the calling party name and number in the optional part.

In multi-carrier telecommunications networks, signaling information must be passed between the different carriers. Various protocols have been developed by the Internet Engineering Task Force (IETF). The IETF's Signaling Transport working group has developed the Session Initiation Protocol (SIP) which can be employed to address the transport of packet-based signaling for VoIP calls.

SS7 messages can be either encapsulated in their entirety within a SIP message body for transparency of ISUP signaling, or the ISUP information can be translated into a SIP message header for the routing of SIP messages by entities such as proxy servers which do not understand the ISUP protocol. The ISUP IAM information can be incorporated into SIP call setup requests known as Invites. The reverse process, converting SIP messages to ISUP messages can be carried out at an IP-to-PSTN interface. In this way, the legacy SS7 signaling information can be preserved for telephone calls made between a mixture of PSTN and IP endpoints.

United States patent application US2004/0192292, describes apparatus for selectively connecting an analogue telephone circuit to either Public Switched Telephone Network (PSTN) based telephony services or packet-based telephony services. The user is able to selectively place or receive calls via either type of service and routing and billing facilities between the carriers must be configured accordingly. The user can receive calls either via a telephone number corresponding to a PSTN based service or via a different telephone number corresponding to the Internet based service. When placing a call, the user can choose which type of service they would like the call to be routed through, each service having a different connection procedure. If a calling party identification service such as Calling Line Identifier (CLI) is employed, the calling party will be identified at the call destination point either by a PSTN based service number or by the packet-based service number. The process of routing telephone calls for multi-service users in a multi-carrier telecommunications network according to the prior art is now described with reference to FIG. 1.

A multi-service user accesses telephone services via a telephone 40 which has access to a multi-carrier network, including a circuit-switched carrier network and a packet-based carrier network. The circuit-switched carrier network 44 is typically a PSTN and the packet-based carrier network 70 provides a VoIP service as shown in FIG. 1 by items 44 and 70 respectively. A Softswitch 42 in the packet-based carrier network interfaces with the PSTN. Softswitches are entities or clusters of entities, also known as Media Gateway Controllers (MGCs) and call agents. Softswitches provide the intelligence that controls packet-based telephony services, including the ability to select processes that can be applied to a call, routing for a call within the network based on signaling and subscriber database information, the ability to transfer control of the call to another network element and management functions such as provisioning, fault detection and billing. Softswitches also provide the architecture for enabling conversion between both signaling protocols such as SS7 and SIP and circuit-switched and packet-based voice calls. For ease of explanation, it is hereafter assumed that a Softswitch is one network entity, although in practice this may be a distributed set of entities.

A media gateway is responsible for handling the media data for calls, the media data being the data packets which contain the payload of the call (e.g. voice data) as opposed to the signaling data packets used for controlling the call. The media gateway typically includes communications switch equipment and operates between a packet-based part of the telecommunications network and the Public Switched Telephone Network.

A multi-service user subscribes to two or more telephony services. Each can provide their own telephony party identifier and the user thus has two or more different telephony party identifiers (TPIs), one supplied by each carrier network operator. These TPIs would typically be telephone dialing numbers allocated to the user by each network operator, and which are used by that network operator's carrier network to route telephone calls to the user.

When a call is made to the multi-service user via the circuit-switched carrier network 44 on the telephone dialing number allocated by the circuit-switched carrier network, a first TPI (TPI1) is placed in a called party number field in the signaling information 58 for that call according to the SS7 (or equivalent) signaling protocol as outlined above. The signaling information 60 containing TPI1 is then used by the circuit-switched carrier network 44 signaling infrastructure to route the call for the user via the circuit-switched carrier network, without passing through the packet-based carrier network 70.

If a call is made to the user via the circuit-switched carrier network 44 on the telephone dialing number allocated by the packet-based carrier network 70, a second TPI (TPI2) is placed in a called party number field in the signaling information 62 for that call according to the SS7 (or equivalent) signaling protocol as outlined above. The signaling information containing TPI2 is then passed as signaling information 64 to the Softswitch 42 responsible for processing calls for the packet-based carrier network. The Softswitch 42 then recognizes from TPI2 that the call is for the telephone 40 of the user and passes on the signaling information containing TPI2 as outgoing signaling information 66, which is sent to the user using the SIP protocol.

When a call is made to the multi-service user via the packet-based carrier network 70 on the telephone dialing number allocated by the packet-based carrier network, TPI2 is placed in the signaling information 68 for that call according to the SIP (or equivalent) signaling protocol as outlined above. The Softswitch 42 receives incoming signaling information 68 containing TPI2 which is then passed as outgoing signaling information 66 on to the telephone 40 of the user. Both the incoming signaling information 68 and the outgoing signaling information 66 are sent using the SIP protocol.

If a call is made to the multi-service user via the packet-based carrier network 70 on the telephone dialing number allocated by the circuit-switched carrier network, TPI1 is placed in the signaling information 72 for that call according to the SS7 (or equivalent) signaling protocol as outlined above. The Softswitch 42 receives the incoming signaling information 72 containing TPI1 and recognizes that the call should be routed to the external network carrier. The incoming signaling information 72 in the SIP protocol messaging is converted into the SS7 protocol and is then passed as outgoing signaling information 74 from the Softswitch 42 to be processed by the circuit-switched carrier network 44.

When a call is made by the multi-service user via the circuit-switched carrier network 44, TPI1 is placed in the signaling information 46 for that call according to the SS7 (or equivalent) signaling protocol as outlined above. The signaling information 48 containing TPI1 is then passed on to the telephone 76 of the destination party via the circuit-switched carrier network 44.

When a call is made by the multi-service user via the packet-based carrier network 70, TPI2 is placed in the signaling information 50 for that call according to the procedure outlined for the SIP (or equivalent) signaling protocol above. The Softswitch 42 receives the incoming signaling information containing TPI2. The Softswitch will judge whether the call should be routed via the circuit-switched carrier network or via the packet-based carrier network. This judgment may depend on whether the destination party is also a subscriber to the packet-based carrier network. If the destination party is not a subscriber to the packet-based carrier network, then the call will be routed via the circuit-switched carrier network, whereas if the destination party does subscribe to the packet-based carrier network, then the call may be routed via the packet-based carrier network. If the call is to be routed via the circuit-switched carrier network, outgoing signaling information 54 containing TPI2 is passed from the Softswitch 42 on to the circuit-switched carrier network 44 as SS7 protocol messaging and is then passed as signaling information 56 on to the telephone 76 of the destination party via the circuit-switched carrier network 44.

If the call is to be routed via the packet-based carrier network, outgoing signaling information 52 containing TPI2 is passed from the Softswitch 42 via the packet-based carrier network 70 to the telephone 78 of the destination party.

As will be appreciated from the above, a problem with conventional multi-service telecommunications networks is that each carrier supplies the subscriber with a different telephone number for their particular service. The routing of data and/or voice calls to and from individual subscribers then involves a plurality of telephone numbers, which can be highly inconvenient and confusing to other users of the system.

One solution would be to move over entirely to a packet-based service and use the telephony party identifier provided by the packet-based service exclusively. However, most users would wish to maintain an alternate telephony service in case the packet-based service is for some reason not available for a period of time, in particular when there is an emergency. It would be desirable to provide an improved method and apparatus for processing telephone calls for users having access to a plurality of telephony services.

SUMMARY OF CERTAIN INVENTIVE ASPECTS

In a first aspect, a method of processing telephone calls in a packet-based telephony service is provided. The method includes maintaining a store of telephony party identifiers for multi-service users having access to telephone call services via a plurality of telephony services including the packet-based telephony service and an alternate telephony service, each of the multi-service users having a telephony party identifier whereby telephone calls can be routed to the multi-service user by the alternate telephony service without passing through the packet-based telephony service. The method further comprises monitoring incoming signaling information for telephone calls in the packet-based telephony service and transmitting outgoing signaling information for the calls and detecting initial telephony party identification data contained in the incoming signaling information for a telephone call between a calling party and a called party. The method further comprises in response to detecting the initial telephony party identification data, determining from the store further telephony party identification data, and inserting the further telephony party identification data into outgoing signaling information for the telephone call, one of the initial telephony party identification data and the further telephony party identification data comprising the alternate telephony service telephony party identifier for the multi-service user, whereby the multi-service user is identified, when conducting a telephone call via the packet-based telephony service, by means of the alternate telephony service telephony party identifier.

In another aspect, a method of processing an outgoing telephone call in a packet-based telephony service is provided wherein multi-service users have access to telephone call services via a plurality of telephony services including the packet-based telephony service and an alternate telephony service, and wherein each multi-service user has a telephony party identifier whereby the user is identified in the packet-based telephony service, and wherein each multi-service user has an alternate telephony service telephony party identifier whereby telephone calls can be routed to the user by the alternate telephony service without passing through the packet-based telephony service. The method comprises transmitting outgoing signaling information for an outgoing call initiated by a multi-service user using the packet-based telephony service, the transmitted outgoing signaling information including both the packet-based telephony service telephony party identifier and the alternate telephony service telephony party identifier for the multi-service user.

In another embodiment a method of processing an outgoing telephone call in a packet-based telephony service is provided wherein multi-service users have access to telephone call services via a plurality of telephony services including the packet-based telephony service and an alternate telephony service, and wherein each multi-service user has a telephony party identifier whereby telephone calls can be routed to the user by the alternate telephony service without passing through the packet-based telephony service. The method comprises transmitting outgoing signaling information for an outgoing call initiated by a multi-service user using the packet-based telephony service, the transmitted outgoing signaling information including the alternate telephony service telephony party identifier for the multi-service user.

In still additional aspects, apparatuses are configured to perform the methods summarized above.

DETAILED DESCRIPTION OF CERTAIN INVENTIVE EMBODIMENTS

Figure 1:
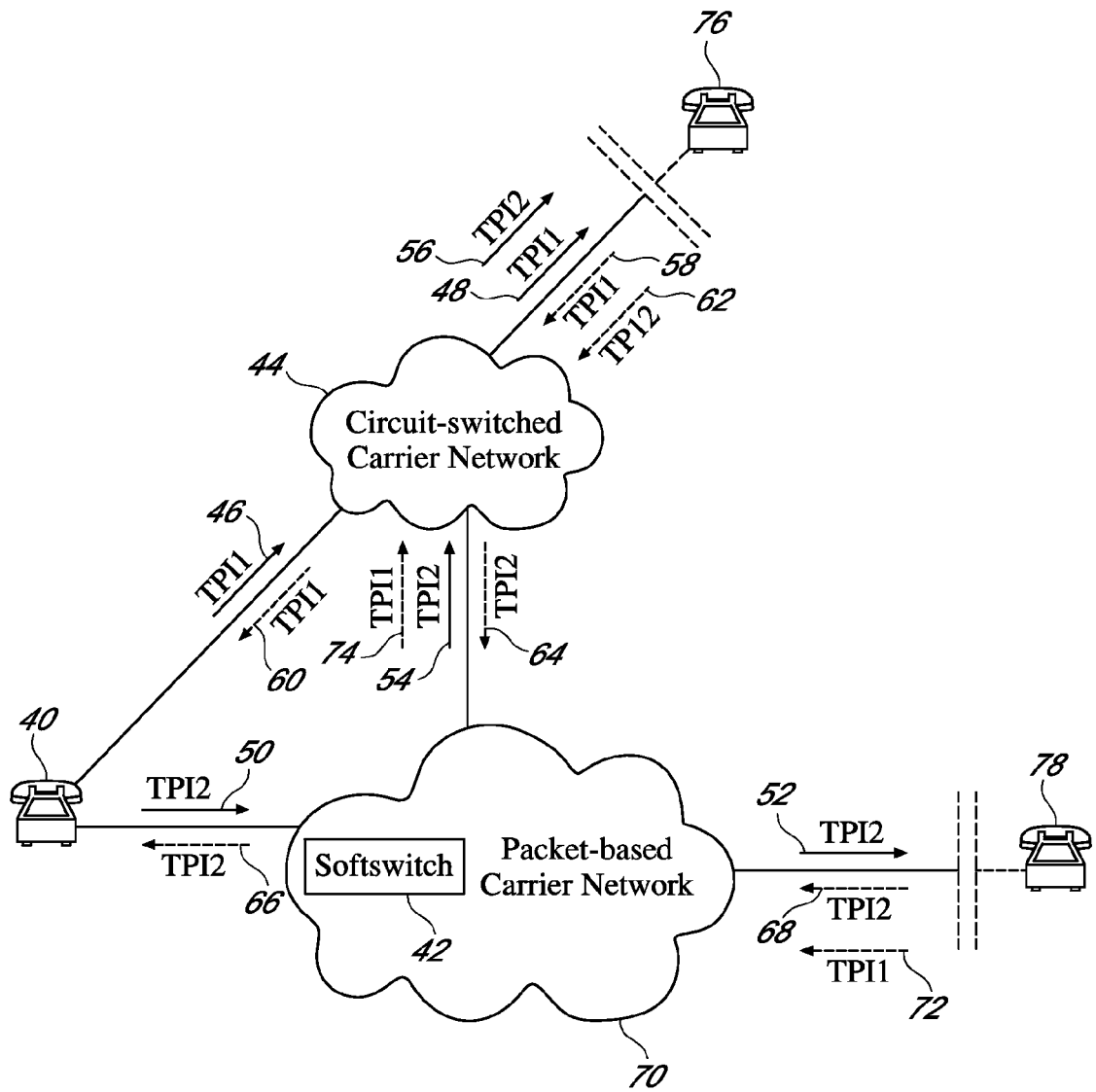
FIG. 1 is a diagram showing voice call processing in a multi-carrier telecommunications network according to the prior art.
Figure 2:
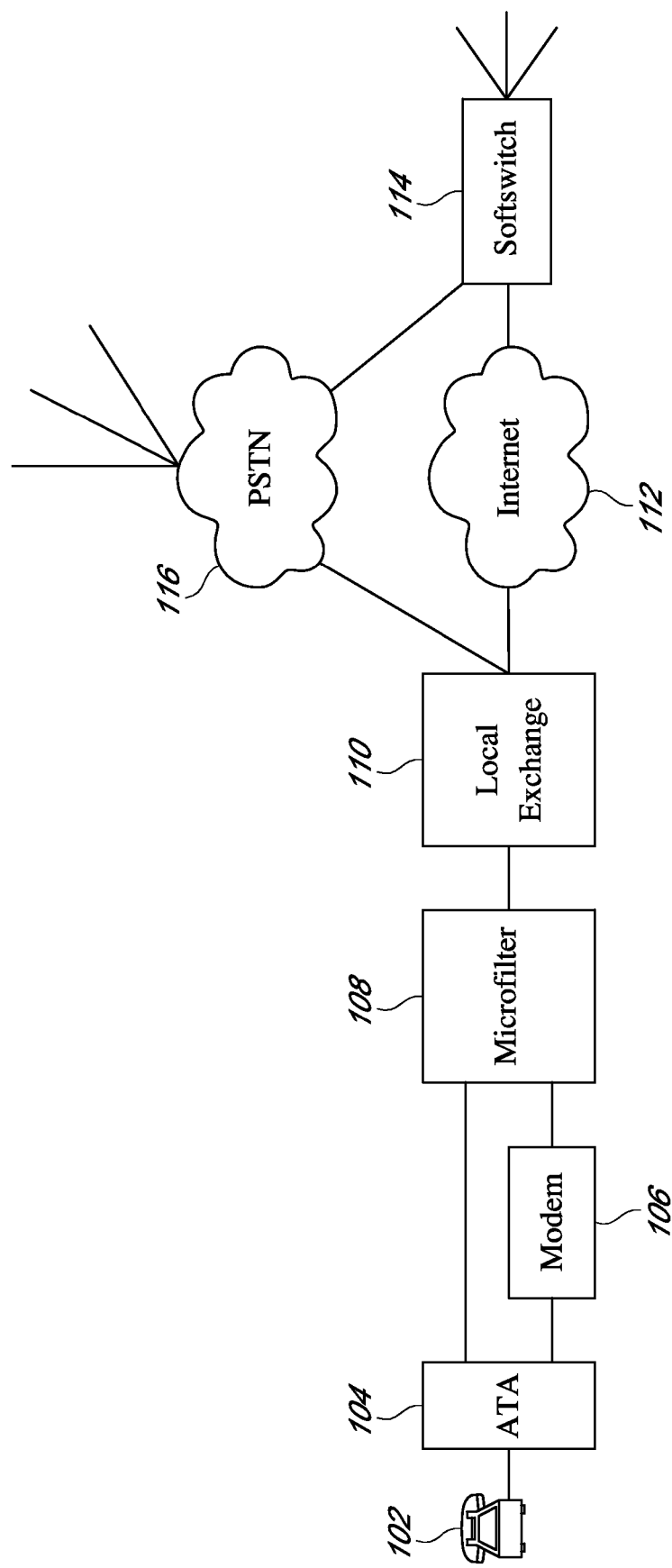
FIG. 2 is an overall system diagram of an example multi-carrier telecommunications network according to an embodiment of the invention.

An overall system diagram according to an embodiment of the invention is shown in FIG. 2. The subscriber is provided with an analogue telephone 102 an Analogue Telephone Adapter (ATA) 104 and a digital modem 106. These components are installed at the subscriber's premises. The ATA 104 incorporates an Ethernet adaptor, for interfacing the analogue telephone 102 with the modem 106. The modem supports packet-based data services. The ATA 104 also includes a Foreign exchange Office (FXO) pass-through adaptor to provide an analogue connection to the PSTN.

By use of the ATA 104, the analogue telephone 102 can be used to make packet-based voice calls over a packet-based network using Voice over Internet Protocol (VoIP) services, thus simulating a pure IP telephone. The digital modem 106 may additionally be connected to a personal computer (PC) or other similar device. The modem 106 provides a digital interface, e.g. a Digital Subscriber Line (DSL) interface, for incoming or outgoing data services. The modem and FXO port are then each respectively connected to a micro filter 108 which enables analogue voice calls and digital signals carrying data services to be multiplexed on standard telephone wires, typically twisted-pair copper wires, in lower and higher frequency bands respectively.

The standard telephone wires pass the signals to the local exchange (LE) 10. At the LE, a filter (not shown) is employed to demultiplex the analogue signals from the digital signals. The analogue signals are passed direct to a PSTN 116 via a local telephone company switch, such as a Class 5 switch or equivalent (not shown). The digital signals, which may contain data to be routed via the Internet, are passed through a Digital Subscriber Line Access Multiplexer (DLSAM) or similar device. A DSLAM is a network device that receives digital signals from multiple digital subscriber connections and delivers the signals on a high-speed backbone to the Internet 112. This may also involve various other components (not shown) such as Asynchronous Transfer Mode (ATMs) switches, Remote Access Servers (RASs) and IP routers.

The main part of the functionality of the present invention can be implemented in a Softswitch 114 located in the packet-based carrier network. The Softswitch 114 may comprise components such as application servers, signaling gateways, media gateways, etc. in a distributed configuration (not shown). Using ISUP IAM messaging and the corresponding framework in SIP, the mandatory variable and optional parts of the framework allow telephony party identifiers (TPIs) to be inserted into the signaling information for calls made in a carrier network. The signaling information can include data fields that identify the calling and called parties involved in the call.

Figure 3:
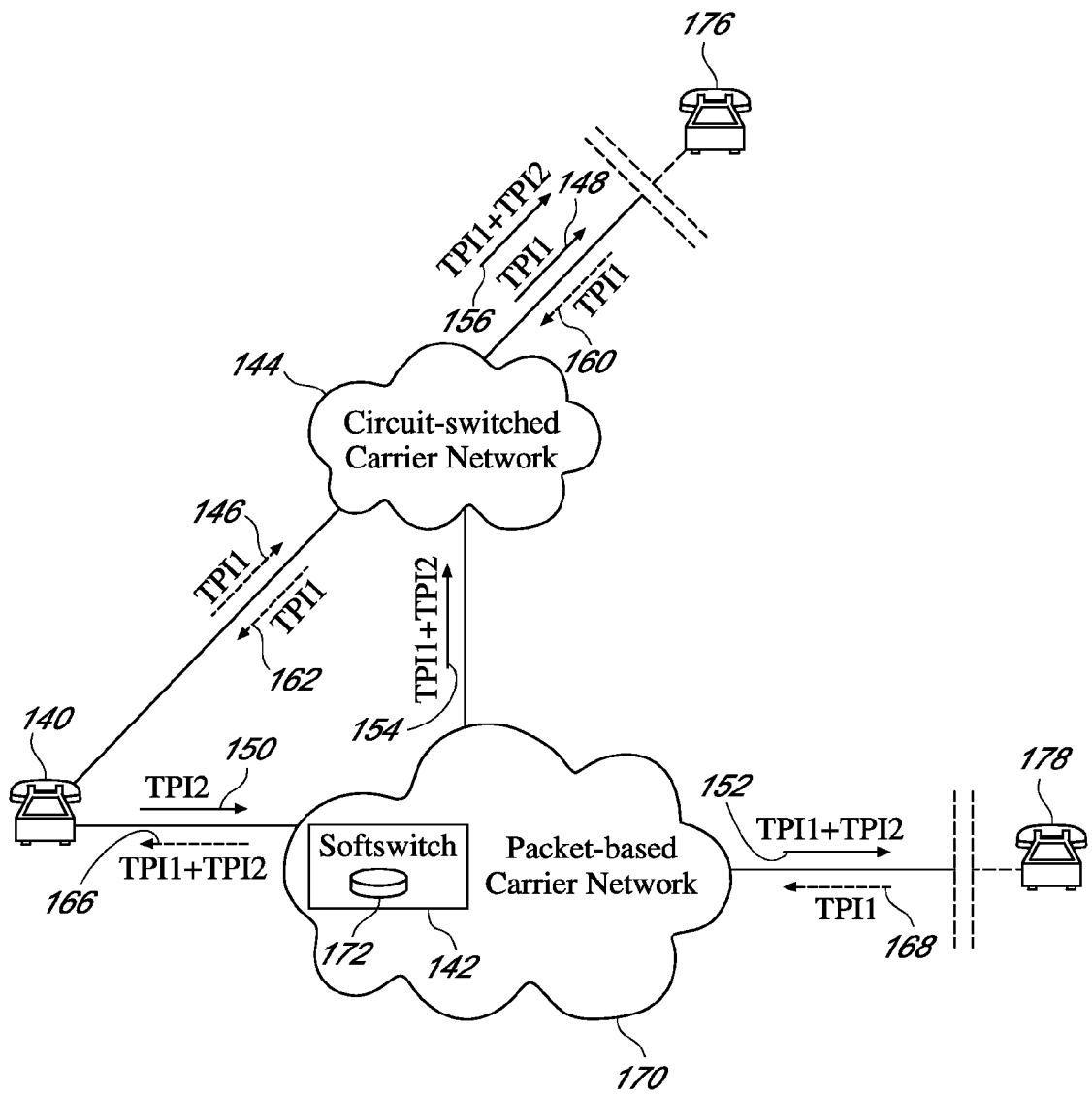
FIG. 3 is a diagram showing voice call processing in a multi-carrier telecommunications network according to an embodiment of the invention.

Examples of processes for routing telephone calls for multi-service users in a multi-carrier telecommunications network according to the present invention are now described with reference to FIG. 3. Here the multi-service user subscribes to two carrier networks but as far as the subscriber is aware only uses one TPI for both networks. In fact, the multi-service user does have one TPI for each carrier network, but one of the TPIs is used only internally within the packet-based telephony service, and is not visible to users of the system.

Incoming Calls

When a call is made to the multi-service user via the circuit-switched carrier network 144 on the telephone number allocated by the circuit-switched carrier network, a first TPI (TPI1) is placed in a called party number field in the signaling information 160 for that call according to the SS7 (or equivalent) signaling protocol as outlined above. Signaling information 162 containing TPI1 is then passed on to the telephone of the multi-service user 140 via the circuit-switched carrier network 144 signaling infrastructure. TPI1 is thus used by the circuit-switched carrier network 44 to route the call to the multi-service user without passing through the packet-based carrier network 170. If a call is made to the multi-service user via the packet-based carrier network 170 on the telephone number allocated by the circuit-switched carrier network, TPI1 is placed in a called party number field in the signaling information 168 for that call, namely in SIP (or equivalent) signaling information. The incoming signaling information containing TPI1 is then received as incoming signaling information by the Softswitch 142 responsible for processing calls for the packet-based carrier network 170.

The Softswitch monitors the incoming signaling information, detects TPI1 and determines whether a multi-service user is involved in the call. This determination is done by accessing a database 172 in which is stored a set of circuit-switched carrier network TPIs for users which also subscribe to the services of the packet-based carrier network. Each circuit-switched carrier network TPI identified in the database is referenced against the corresponding packet-based carrier network TPI for that user. If TPI1 is contained in the set, then the Softswitch looks up and inserts the corresponding packet-based carrier network TPI, i.e. TPI2, into a called party number field in the outgoing signaling information for the call, namely the SIP (or equivalent) signaling information. This outgoing signaling information 166 is then used to route the call to the telephone 140 of the multi-service user via the packet-based telephony service. The inserted telephony party identification data TPI2 can either be in addition to or can replace TPI1.

Note that, in the special case where the calling party is using the packet-based carrier network and is also a multi-service user, this further calling party will have its TPIs processed as per the procedure for outgoing calls, to be described below, at the same time as the TPIs are processed for the first-mentioned multi-service user.

Outgoing Calls

When a call is made by the multi-service user via the circuit-switched carrier network 144, TPI1 is placed in a calling party number field in the signaling information 146 for that call according to the procedure outlined for the SS7 (or equivalent) signaling. The signaling information 148 containing TPI1 is then passed on to the telephone 176 of the destination party via the circuit-switched carrier network 144.

When a call is made by the multi-service user via the packet-based carrier network 170, TPI2 is placed in a calling party number field in the signaling information 150 for that call, namely in the SIP (or equivalent) signaling information. The Softswitch 142 receives the incoming signaling information containing TPI2. Here the Softswitch judges whether the call should be routed via the circuit-switched carrier network or via the packet-based carrier network, with the judgment being made on similar grounds to the judgment described above for outgoing calls according to the prior art. The Softswitch 142 monitors the incoming signaling information, detects TPI2 and determines whether a multi-service user is involved in the call. As before, this determination is carried out by accessing the database 172 in which is stored a set of packet-based carrier network TPIs for multi-service users. If TPI2 is contained in the set, then the Softswitch looks up and inserts the corresponding circuit-switched carrier network TPI, i.e. TPI1, into the outgoing signaling information for the call, namely the SIP (or equivalent) signaling information. Here both TPI1 and TPI2 will be retained in the signaling information for the call.

If the call is to be routed via the circuit-switched carrier network, the outgoing signaling information containing TPI1 and TPI2 in the SIP messaging is converted into the SS7 protocol and is then passed as signaling information 154 from the Softswitch 142 on to the circuit-switched carrier network 144. This outgoing signaling information 156 is then passed on to the destination telephone 176 via the circuit-switched carrier network 144. The outgoing signaling information preferably includes TPI2 in the charge number field, so that any billing record subsequently received from the circuit-switched carrier records can include TPI2 whereby the multi-service user can be identified, whilst the outgoing signaling information preferably includes TPI1 in the calling party number field, so that the multi-service user can be identified, using calling line identifier (CLI), at the called party, by means of TPI.

If the call is to be routed via the packet-based carrier network, the outgoing signaling information 152 containing TPI1 (and possibly TPI2 too) following the SIP protocol is passed from the Softswitch 142 via the packet-based carrier network 170 and on to the destination telephone 178 via the packet-based carrier network 170. TPI1 is encoded in the SIP signaling message in such a way as to ensure that, if the destination telephone equipment is capable of identifying the calling party for the purposes of presenting calling party identity or applying selective call handling treatment based on the identity of the calling party, then such equipment will treat TPI1 as the calling party identity. TPI2 may be encoded in the SIP signaling message for the purpose of identifying the caller (for example, for billing purposes) if the SIP message is to transit one or more intermediate softswitches prior to its transmittal to the destination telephone. TPI2 can be removed from the SIP signaling message by the Softswitch which transmits the message to the destination telephone.

It should be noted here that these steps require no configuration of the external network to accommodate calls to and from the packet-based carrier network. This means that CLECs can use the existing infrastructure of the ILEC without the ILEC carrier network. If any of the details of the multi-service user change or new multi-service users join the CLEC, this can be accommodated by updating the TPI lists in the database 172 connected to the Softswitch 142.

Another advantage of the present invention is that a person wishing to telephone the multi-service user need only dial one telephone number, irrespective of which network the telephone call is routed through. This saves other parties having to remember a plurality of TPIs whereby to identify the multi-service user. When the multi-service user makes a call, the destination telephone always receives TPI1, irrespective of which network the call is routed through. This can be employed by a Calling Line Identifier service (or similar) to identify the multi-service user as the calling party at the destination telephone for calls placed over either network.

Some mention was made above as to the reasons behind routing a telephone call either via the circuit-switched carrier network or via the packet-based carrier network. It is envisaged that calls would be routed by default via the packet-based carrier network as packet-based switching resources tend to be cheaper than circuit based resources, This is, after all, one of the main driving forces behind the push for VoIP technology.

A call may have to be routed through the circuit-switched carrier network if the packet-based carrier network is unavailable for some reason. The circuit-switched carrier network envisaged here is a PSTN, which provides service even during electricity power-cuts, so it can be safer to route all emergency calls through the circuit-switched carrier network even if the packet-based carrier network is functioning correctly, to avoid any loss of time should the packet-based carrier network fail during an emergency call. A further embodiment of the present invention is envisaged for the outgoing scenario where both TPI1 and TPI2 are added to the signaling information locally to the multi-service user in one or the other or both of the mandatory and optional parameter parts of the ISUP message. The Softswitch would then receive incoming signaling information which contains TPI1 and TPI2. TPI1 and TPI2 would then be included in the outgoing signaling information and no further telephony party identification data need be added to the outgoing signaling when routing to either the external or packet-based carrier networks.

Network interworking problems can be created when calls having a number allocated by the ILEC as the originating number are routed from the CLEC network through the ILEC infrastructure. With the present invention, the retained packet-based carrier network TPI can be used to identify calls routed from the packet-based carrier network (in this embodiment the CLEC network) to the circuit-switched carrier network (in this embodiment the ILEC network), which can reduce or eliminate such undesirable network interworking problems. When multi-service billing data is received for the telephone call services, the retained packet-based carrier network TPI can be used to facilitate the identification of the responsible network operator for the telephone call charges that are payable.

The above embodiments are to be understood as illustrative examples of the invention. Further embodiments of the invention are envisaged. The foregoing discussion has focused mainly on two carrier networks, the packet-based carrier network and the circuit-switched carrier network, but the present invention would also be viable where more than two carrier networks are involved.

It is envisaged that the present invention could be applied to the area of mobile telephony, so instead of a black telephone the multi-service user could have a mobile station. The circuit-switched carrier network could for example be of a cellular radio mobile network carrier and the packet-based carrier network could for example be accessed via a packet-based wireless local area network (WLAN). Calls to and from the mobile station could then be routed by default via the GSM type network, but when in signal range of the WLAN (i.e. in a wireless "hotspot") the calls could alternatively be routed via the WLAN and then on via the packet-based carrier network. It is further envisaged that the present invention could be used in a multicast environment where the multi-service user is conducting a teleconference with several other parties or vice versa. The Softswitch could multicast the signaling and audio media stream to and from the parties as required.

The above discussion explains the present invention where the packet-based carrier network packet based signaling protocol is SIP. The present invention is equally applicable to other packet based protocols such as the popular H.323 protocol administered by the ITU-T or the Skype™ system. As protocols for the Internet are constantly evolving, it is envisaged that the present invention would be compatible with the next and beyond generations of such protocols. The signaling information used in either, or each, carrier network, may include one or more of the following formats, or variants thereof: Signaling System 7 (SS7), H.323, Caller ID, Gateway Control Protocol (Megaco H.248), Media Gateway Control Protocol (MGCP), Remote Voice Protocol Over IP Specification (RVP over IP), Session Announcement Protocol (SAPv2), Simple Gateway Control Protocol (SGCP), Session Initiation Protocol (SIP), Session Initiation Protocol for Telephones (SIP-T), Skinny Client Control Protocol, Transmission Control Protocol (TCP) Skype Protocol, Skype™ system.

The media data for the telephone calls may include one or more of the following formats, or variants thereof Digital Video Broadcasting (DVB), Real-Time Transport Protocol (RTP), Video stream for transport using RTP (H.261), Bit-stream in the RTP (H.263), RTP Control protocol (RTCP), User Datagram Protocol (UDP).

The above discussion explains how the telephony party identification data is transported in ISUP messages. However, the present invention is not limited to this one framework for transfer of the telephony party identification data. Further, note that, whilst in the above embodiments the different telephony services are provided by two different carrier networks, other embodiments are envisaged in which the different telephony services are provided by a single carrier network.

The above description of the invention and the following claims refer to telephone calls in a multi-service telecommunications network. This is not intended to restrict the area of application of the invention to purely voice calls, and application to other media types is envisaged. The invention could be applied to any remote session where data passes from one point to another or vice versa in simplex or duplex form, in real-time or otherwise. The data could be voice, sound, video, fax, email, multimedia or such like. In one embodiment of the invention, the telephony party identification data in the incoming signaling information for a call is a telephone dialing number allocated to a user by a network operator. Alternatively, in another embodiment of the invention, the telephony party identification data in the incoming signaling information for a call is an IP address for a user's SIP telephone. In a further embodiment of the invention, the telephony party identification data in the incoming signaling information for a call is a combination of an identity of the media gateway device serving a user and an identity of the port through which a user is served on that device. In a still further embodiment of the invention, the telephony party identification data in the incoming signaling information for a call is some other form of identifier whereby the call can be associated with a user.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing telephone calls in a multi-carrier telecommunications network including a local exchange to connect a telephone associated with a multi-service user to a public switched telephone network (PSTN) and to a packet-based telephony network, the method comprising:
   at a softswitch in the packet-based telephony network:
   maintaining a store of telephony party identifiers for multi-service users having access to telephone call services via a plurality of telephony networks including the packet-based telephony network and the PSTN, each of the multi-service users having a PSTN telephony party identifier whereby the user is identified in the PSTN and whereby telephone calls are routed to the multi-service user by the PSTN without passing through the packet-based telephony network and a packet-based telephony party identifier whereby the user is identified in the packet based telephony network and whereby telephone calls are routed to the user by the packet-based telephony network identifier without passing through the PSTN;
   monitoring incoming signaling information for telephone calls in the packet-based telephony network and transmitting outgoing signaling information for the calls;
   detecting initial telephony party identification data contained in the incoming signaling information for a telephone call between a calling party and a called party, the initial telephony party identification data comprising the packet-based telephony network identifier which identifies the multi-service user in the packet-based service, wherein the multi-service user is the calling party for the telephone call; and in response to detecting the initial telephony party identification data, determining from the store further telephony party identification data, and inserting the further telephony party identification data into outgoing signaling information for the telephone call, the further telephony party identification data comprising the PSTN telephony party identifier, wherein the further telephony party identification data is inserted to allow the called party to identify the multi-service user as the calling party for the telephone call, and whereby the multi-service user is identified, when conducting an outgoing telephone call via the packet-based telephony service, by means of the PSTN telephony party identifier.

2. The method of claim 1, comprising retaining the initial telephony party identification data in the outgoing signaling information for the telephone call.

3. The method of claim 2, comprising receiving billing data relating to the call from a provider of the PSTN, the billing data identifying the multi-service user by means of the initial telephony party identification data.

4. The method of claim 1, wherein the packet-based telephony party identifier is a telephone dialing number.

5. The method of claim 1, further comprising:
for a first telephone call between the multi-service user, acting as a calling party, and a called party:
detecting first initial telephony party identification data contained in the incoming signaling information for the first telephone call, and
in response to detecting the first initial telephony party identification data, determining from the store first further telephony party identification data, and inserting the first further telephony party identification data into outgoing signaling information for the first telephone call, the first further telephony party identification data comprising the PSTN telephony party identifier,
whereby the multi-service user is identified, when initiating a telephone call via the packet-based telephony network, by means of the PSTN telephony party identifier, at the called party; and for a second telephone call between the multi-service user, acting as a called party, and a further multi-service user, acting as a calling party:
detecting second initial telephony party identification data contained in the incoming signaling information for the second telephone call, the second initial telephony party identification data comprising the PSTN telephony party identifier; and
in response to detecting the second initial telephony party identification data, determining from the store second further telephony party identification data, and inserting the second further telephony party identification data into outgoing signaling information for the telephone call,
whereby the multi-service user is identified, when receiving a telephone call via the packet-based telephony network, by means of the PSTN telephony party identifier.

6. The method of claim 5, further comprising:
for the second telephone call:
detecting third initial telephony party identification data contained in the incoming signaling information for the second telephone call, and
in response to detecting the third initial telephony party identification data, determining from the store third further telephony party identification data, and inserting the third further telephony party identification data into outgoing signaling information for the second telephone call, the third further telephony party identification data comprising a further the PSTN telephony party identifier for the further multi-service user,
whereby the further multi-service user is identified, when initiating the second telephone call via the packet-based telephony network, by means of the further PSTN telephony party identifier.

7. The method of claim 1, wherein the packet-based telephony service is a Voice over Internet Protocol (VoIP) service.

8. The method of claim 1, wherein the maintained store includes a database held remote from the multi-service users.

9. The method of claim 1, wherein the PSTN telephony party identifier comprises a telephone dialing number.

10. A method of processing an outgoing telephone call in a multi-carrier telecommunications network comprising a local exchange to connect a telephone associated with a multi-service user to a public switched telephone network (PSTN) and to a packet-based telephony network, wherein multi-service users have access to telephone call services via a plurality of telephony networks including the packet-based telephony network and the PSTN, wherein each multi-service user has a packet-based telephony party identifier whereby the user is identified in the packet-based telephony network and whereby telephone calls are routed to the user by the packet-based telephony network without passing through the PSTN, and wherein each multi-service user has a PSTN telephony party identifier whereby the user is identified in the PSTN and whereby telephone calls are routed to the user by the PSTN without passing through the packet-based telephony network, the method comprising:
transmitting outgoing signaling information for an outgoing call initiated by a multi-service user using the packet-based telephony network, the transmitted outgoing signaling information including both the packet-based telephony party identifier and the PSTN telephony party identifier for the multi-service user.

11. The method of claim 10, wherein the outgoing signaling information is transmitted to the PSTN.

12. A method of processing an outgoing telephone call in a multi-carrier telecommunications network comprising a local exchange to connect a telephone associated with a multi-service user to a public switched telephone network (PSTN) and to a packet-based telephony service, wherein multi-service users have access to telephone call services via a plurality of telephony networks including the packet-based telephony network and the PSTN, wherein each multi-service user has a telephony party identifier whereby the user is identified in the packet-based telephony network, and wherein each multi-service user has a PSTN telephony party identifier whereby telephone calls can be routed to the user by the PSTN without passing through the packet-based telephony service, the method comprising:
transmitting outgoing signaling information for an outgoing call initiated by a multi-service user using the packet-based telephony service, the transmitted outgoing signaling information including the PSTN telephony party identifier for the multi-service user.

13. The method of claim 12, wherein the outgoing signaling information is transmitted to the PSTN.

14. An apparatus configured to perform the method of claim 1.

15. An apparatus configured to perform the method of claim 10.

16. An apparatus configured to perform the method of claim 12.

* * * * *